United States Patent [19]
Becnel, Jr. et al.

[11] Patent Number: 5,366,514
[45] Date of Patent: Nov. 22, 1994

[54] SALT PLANT EVAPORATION

[75] Inventors: Lawrence F. Becnel, Jr., Sugarland; John E. Currey, Fair Oaks Ranch; Raymond W. Ver Hoeve, Houston, all of Tex.

[73] Assignee: Texas Brine Corporation, Houston, Tex.

[21] Appl. No.: 998,927

[22] Filed: Dec. 30, 1992

[51] Int. Cl.$^5$ .......................... C01D 1/30; B01D 1/28
[52] U.S. Cl. .................... 23/303; 60/39.182; 60/618; 159/24.3; 159/47.1; 203/24; 422/245.1
[58] Field of Search .................. 23/302 R, 303, 302 T; 60/39.182, 618; 159/47.1, 24.3; 203/24; 422/245

[56] References Cited

U.S. PATENT DOCUMENTS

| | | | |
|---|---|---|---|
| 3,647,396 | 3/1992 | DeWittle et al. | 23/299 |
| 3,655,333 | 4/1972 | Stenger et al. | 23/89 |
| 4,094,747 | 6/1978 | Pfenninger | 159/24 A |
| 4,239,603 | 12/1980 | Egosi | 159/2.1 |
| 4,276,117 | 6/1981 | Geesen | 159/47 R |
| 4,503,681 | 3/1985 | Willyoung et al. | 60/655 |
| 4,553,396 | 11/1985 | Heizer | 60/648 |
| 4,571,949 | 2/1986 | Moke | 60/655 |
| 4,581,829 | 4/1986 | Becker | 34/15 |
| 4,733,536 | 3/1988 | DiBella et al. | 60/618 |
| 4,882,009 | 11/1989 | Santoleri et al. | 159/16.1 |
| 4,899,544 | 2/1990 | Boyd | 60/618 |
| 4,942,734 | 7/1990 | Marbreiter et al. | 60/39.182 |

OTHER PUBLICATIONS

Fifth International Symposium on Salt–Northern Ohio Geological Society, (1980) Article by A. Pavik, G. Arcangeli & J. C. Gallot pp. 335–339.
Encyclopedia of Chemical Technology, Kirk–Othmer, 3rd Ed (1981), vol. 9 under Energy Management, pp. 21–45; under Evaporation, pp. 472–493.
Encyclopedia of Chemical Processing & Design, J. J. McKetta, vol. 20, (1982) under Evaporator Operation, pp. 396–445; vol. 24, under Gas Turbines pp. 215–280 (1982).
Perrys Chemical Engineers' Handbook, 6th Ed, (1984) under Evaporators, pp. 11-31 thru 11-43.
The Handbook of Evaporation Technology, Paul E. Minton, Noyes Publications (1986), Chapter 19 pp. 186–205.

Primary Examiner—Gary P. Straub
Attorney, Agent, or Firm—Peter F. Casella

[57] ABSTRACT

This invention relates to an evaporative salt plant installation including methods of operation and apparatus which produce high purity salt economically and in high yield comprising the combination of a gas turbine which drives a vapor compressor, whose exhaust gases are used to produce steam to drive a topping steam turbine generator, which in turn generates the electrical energy requirements of the plant, and wherein the discharge vapors from the steam turbine are combined with the discharge vapors from the vapor compressor, which is in turn in combination with a vapor compression evaporator and a purge evaporator, whereby both evaporators produce salt, and where the overhead vapors of the purge evaporator are used in a brine cooled condenser to preheat input cold brine, thereby producing water condensate which is recovered, along with evaporator steam chest condensate streams, and used in solution mining underground salt, thereby allowing for both the productive use and recovery of substantially all the raw material and energy inputs to the plant, and the friendly environmental operation of the plant.

26 Claims, 2 Drawing Sheets

SALT PLANT EVAPORATION

BACKGROUND OF THE INVENTION

Salt is one of the most abundant materials on earth and is one of the largest volume inorganic materials used in industry in the production of chlorine and caustic soda by the electrolytic processes and is used in the manufacture of many products, both organic and inorganic. Salt is also used for snow and ice control and as a mineral in animal diets, as a food preservative and for flavoring food. Salt is the most common and readily available non-metallic mineral in the world. Oceans contain an inexaustible supply of salt. The identified resources of salt in the United States alone are estimated at over sixty trillion tons.

Salt is produced by direct removal as rock salt from underground deposits, by solution mining underground deposits, or by evaporation from solution mining or naturally occuring brines or sea water. Underground deposits are large beds of concentrated salt which have been deposited through evaporation of brines over the geological ages. Underground deposits are mined as rock salt using conventional mining techniques or by solution mining creating a brine. In solution mining water is pumped into the salt bed, the salt is dissolved in the water and the resultant brine is brought to the surface. Many processes and techniques have been disclosed for the mining and production of salt from these various raw material sources, and many processes and techniques have been disclosed for the purification of the salt produced by the mining processes. U.S. Pat. Nos. 3,647,396 and 3,655,333 are examples of disclosures of processes for purifying salt already produced.

Processes have been employed and described in the prior art for the production of high purity salt at the initial site where the salt recovery processes are used for the mining of the salt. Because of the high cost of energy, especially in the cost of petroleum derived energy, created by the changes in the mid-east two decades ago, which created the energy crisis, many attempts have been made to optimize the conservation of energy in the production of high quality salt. Background information on the processes, equipment and techniques employed in these endevours are described in the Encyclopedia of Chemical Technology, edited by Kirk-Othmer, Third Edition, Volume 9, under the heading Energy Management starting on page 21 through 45, and under the heading Evaporation, starting on page 472 through 493. Additional background information is also disclosed in the Encyclopedia of Chemical Processing and Design, edited by John J. McKetta, Volume 20, under the heading Evaporator Operation starting on page 396 continuing under the heading Evaporation through page 445. Perry's Chemical Engineers' Handbook, Sixth Edition, under Evaporators, starting on page 11-31 through 11-43 also provides background information related to this invention.

A recent process design for the production of evaporative salt from solution mined brine which pursues the objectives of making salt while at the same time conserving the use of energy is described in the publication of the Fifth International Symposium on Salt—Northern Ohio Geological Society in an article by A. Pavik, G. Arcangeli and J. C. Gallot, starting on page 335 thru 339. The article describes a process installed by Montedison at Ciro Marina-Calbria, Italy. The article describes a salt plant with solution mining and an evaporation plant employing quadruple effect evaporators and a mechanical recompression evaporator and includes the generation of steam at high pressure which is used to drive two steam turbines. One of these steam turbines is connected to an alternator which generates the necessary electric current used in the plant and the other is used to drive a compressor which recompresses the vapors from the single effect evaporator, so that it can be reused in the heating elements of the single effect evaporator. The excess steam from both steam turbines is used to drive the quadruple effect evaporator train.

In accordance with this invention, we employ an evaporative salt plant, including methods of operation and apparatus which produce high purity salt economically and in high yield, comprising the combination of a gas turbine which drives a vapor compressor while the gas turbine exhaust gases are used to produce high pressure steam which is used to drive a steam turbine, which in turn generates the electrical energy requirements of the plant, and wherein the discharge vapors from the steam turbine are combined with the discharge vapors from the vapor compressor, which is in turn in combination with a vapor compression evaporator and a purge evaporator, whereby both evaporators produce salt, and where the overhead vapors of the purge evaporator are used in a brine cooled condenser to preheat input cold brine. Water condensate is recovered from the evaporator heater and brine cooled condenser and used in solution mining the underground salt, thereby allowing for productive use and recovery of substantially all the raw material and over 70% of energy inputs to the plant, and friendly environmental operation of the plant.

OBJECTS OF THE INVENTION

It is an object of this invention to provide an evaporative salt plant design, including methods, apparatus and systems for operating the plant, to produce high quality salt, in high yield and with considerable savings in both initial capital investment and operating costs especially in the energy required per ton of salt produced.

It is a further object of this invention to provide an evaporative salt plant which produces salt of at least 99.99% and up to 99.9974% purity, with increases in yield or capacity of up to 50%, and with savings in operating cost of up to 75% of the energy cost to produce a ton of high purity salt, as compared to existing vapor recompression evaporation technology. A 40% and 50% savings in energy use per ton of product is obtained from the single and two stage evaporation plants described later in connection with FIGS. I and II, respectively, when compared to the Montedison plant design described in the Northern Ohio Geological publication referred to above.

It is still a further object of this invention to produced salt by this invention which is suitable for use without further purification in chlor-alkali electrolytic cells for making chlorine and caustic soda of the diaphragm or mercury cell type, and with minimal ion exchange treatment for use in membrane type cells, and for direct use in the production of sodium in molten salt electrolytic cells, and also for many other uses without further purification, including commercial food grade applications.

It is also an object of this invention to provide methods for operating the unique evaporative salt plant involving the combination of gas turbine, steam turbine, vapor recompression and purge evaporators, in combination with a brine cooled condenser, at or near the site where the salt is solution mined in a way which allows for the recovery and productive use in the plant of substantially all of the raw material and a large percentage of energy inputs to the plant.

It is a still further object of this invention to provide an evaporative salt plant and methods of operation which allow for the disposal of waste by-product solutions in disposal wells at the plant site and which also allows for the recovery of the water condensate produced in the plant for use in the solution mining of the underground salt thereby providing an environmentally friendly operation which contributes to maintaining the ecological balance in both the energy and the materials employed in the operation of the plant.

The use of steam turbines or electric motors to drive vapor recompression evaporators in the production of salt from brine has been employed and described in the prior art processes, for example as disclosed in the Pavlik article referred to above. However, the employment of steam turbines does not allow for the maximumizing of the conservation of energy or savings in costs per ton of salt produced, or the production of the highest purity salt with the highest yield, as compared with the employment of the unique combination of elements in accordance with this invention.

Gas turbines of the combustion type are described in the McKetta Encyclopedia referred to above in Volume 24, pages 215- 280, with pages 267-280 being devoted to the use of gas turbines in cogeneration, i.e. the generation of both heat and power.

BRIEF DESCRIPTION OF THE INVENTION

These and other objects are accomplished by applicant's invention comprising an evaporative salt plant including methods, apparatus and systems employing a unique combination of a combustion type gas turbine, where the heat energy from the gas turbine exhaust generates high pressure steam while, at the same time, the gas turbine shaft energy drives a vapor compressor, which is in further combination with a combination of a vapor compression evaporator and a purge evaporator, which evaporators produce the high yield and high purity salt, in combination with a brine cooled condenser which partially preheats the raw material brine input to the plant and allows for the recovery of the condensate produced in the plant for use in the solution mining of salt.

The objects of this invention are also realized by applicants invention which further comprises employing in combination, a gas turbine which drives a vapor recompressor, with the gas turbine exhaust heat being recovered in a heat recovery steam generator (HRSG), where high pressure steam is generated and utilized to power a steam turbine, which in turn generates the electrical energy requirements of the plant and whose discharge vapors are used in combination with the discharge vapors of the vapor compressor to effect boiling in a salt producing evaporator, which produces excess water vapor overheads above which the vapor compressor has sufficient capacity to handle, which excess vapors are first used in a purge evaporator to produce additional salt and where the water vapor overheads of the purge evaporator are used in combination with a brine cooled condenser, to partially preheat the input brine to the system, thereby producing water condensate which is combined with evaporator heater condensate and together used in the solution mining of the underground salt.

In order that this invention may be more readily understood it will be described with respect to simplified flow diagrams and to certain preferred embodiments, especially as contained in the attached Figures, and examples given below; however it is to be understood that these embodiments are not to be construed as limiting the invention except as defined in the appended claims.

BRIEF DESCRIPTION OF THE DRAWINGS

FIG. I is a flow sheet of a preferred embodiment of the unique evaporative salt plant design which provides the high purity salt in high yield with considerable energy savings.

FIG. II is a flow sheet of another preferred embodiment of this invention showing a gas turbine two stage vapor recompression evaporator unit which offers still further capacity advantages and energy cost savings per ton of high quality salt produced.

DETAILED DESCRIPTION OF THE INVENTION

Figure 1:
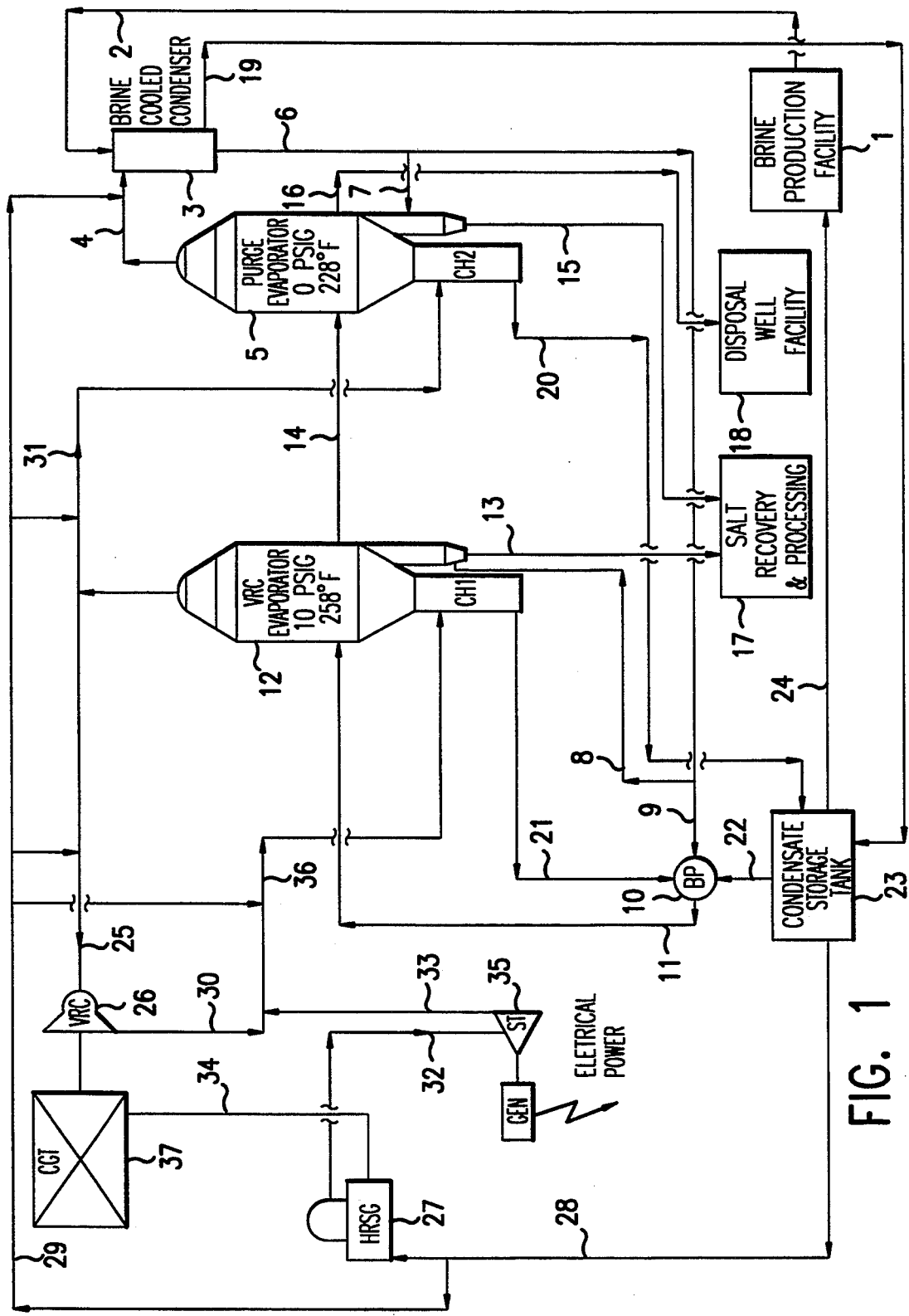
Figure 2:
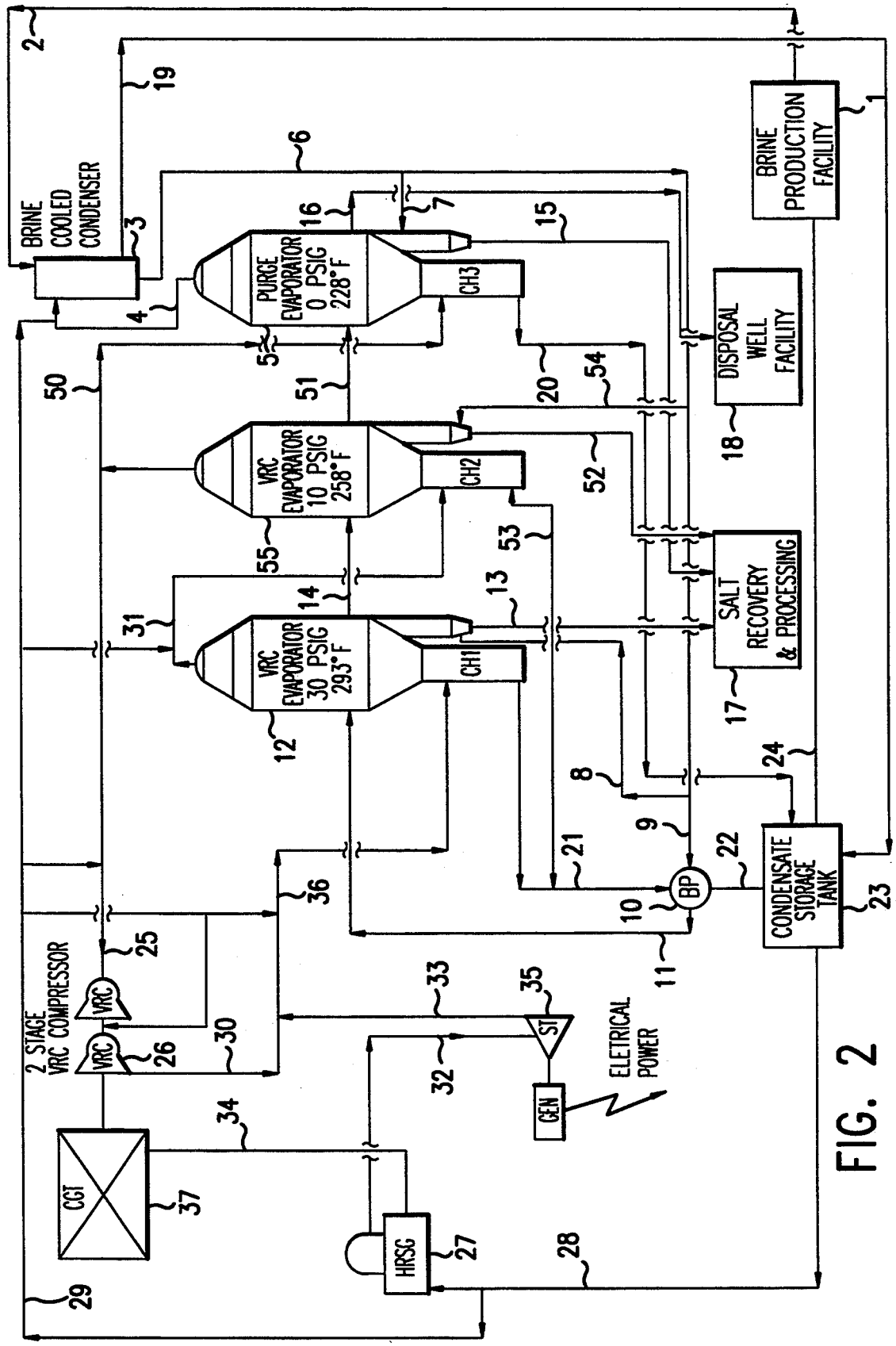

We have found an evaporative salt plant installation including methods, apparatus and systems comprising a combustion type gas turbine, such as Solar Mars or Centaur Taurus gas turbines (Solar Corporation, San Diego, Calif.), the exhaust gases of which are employed to raise steam to drive a steam turbine which in turn generates the electrical energy requirements of the plant, while the discharge vapors from the steam turbine are used in combination with the discharge vapors from a centrifugal vapor compressor to evaporate brine thereby producing salt and water condensate, in a combination of a vapor recompression evaporator with a purge evaporator, the overhead vapors of the purge evaporator being used for partial preheating the plants input brine requirements, in a brine cooled condenser, which allows for the recovery of the balance of water condensate and its subsequent use in solution mining of the underground salt. Thus in accordance with our invention, there is both productive and conservation use and recovery of the raw materials and energy inputs to the plant, providing high yields of high purity salt production, while at the same time maintaining ecological balances in both the energy balance and the materials balance employed in the operation of the plant, thereby producing a friendly environmental operation of the plant.

Among the features of this invention which are shown in the Figures are the following:

A heat recovery steam generator (HRSG), such as ERI tubular waste heat boiler, (Nebraska Boiler, Inc., Lincoln, Nebr.) to recover gas turbine exhaust heat by generation of high pressure steam which, after being expanded in a steam turbine driving a generator, is used to apply additional heat input to the vapor compression evaporator steam chest, which produces additional salt slurry and an excess of water vapor overheads.

Also, by routing this excess water vapor to a purge evaporator, which is operated at near atmospheric pressure in accordance with our invention, further boiling is induced to produce more salt from feed streams routed to it, as more fully described in connection with the Figures.

Still further, by employing vapors from the purge evaporator in the initial stage of preheating the feed brine, either before or after it is employed in washing the salt slurry from the elutriating legs of both the vapor compression evaporator and the purge evaporator, a brine temperature of in excess of 140 degrees Farenheit is produced as the brine is used to condense all vapors from the purge evaporator, thereby not only allowing completion of recovery of about 95% of the water required for the solution mining of the underground salt, but also for further use of the heat energy so produced.

In addition, by employing the combination of a vapor compression evaporator and a purge evaporator, in accordance with our invention and operations, instead of employing the quadruple effect or other multiple effect evaporators in the production of salt as described in the prior art, we achieve superior energy economy, and avoid the necessity of vacuum operation of the evaporators we employ, while at the same time being able to produce high purity salt of less than 25 ppm sulfate ion and less than 2 ppm total metals, including calcium, magnesium, strontium and other undesirables, thereby allowing for production of NaCl having 99.9974+% purity.

Furthermore, when employing the unique combination of elements as disclosed herein at the site of the solution mining of the brine, the disposal of by-product waste solutions may not only be returned to the earth, where they originally came from, in disposal wells, thereby aiding in preserving the ecological balance, but in addition by utilizing a brine disposal well one may employ a satisfactory purge for controlling the amount of sulfate in the vapor compression and purge evaporators thereby allowing for the production of very pure salt crystalls.

A significant advantage is realized by employing a two stage vapor recompressor in combination with two vapor recompression evaporators in series as shown in FIG. II. This combination alone provides for an 8 to 10% increase in production capacity and concomitant energy and manufacturing cost reductions. Then, upon adding the purge evaporator, an additional 10% capacity boost is achieved at no added energy cost. Thus the combination shown in FIG. II has a capacity of about 3000 tons per day versus about 2500 tons per day for the process in FIG. I, and the two stage system of FIG. II operates with essentially the same total fuel input to the process as is used in the system of FIG. I, because the same molel gas turbine is employed.

The basic distinction between employing FIG. I and FIG. II processes is in the compressor design. A single wheel, 1.8:1 compression ratio centrifugal machine is employed for driving the single VRC evaporator whereas a two stage (two wheels or more), 3.2:1 compression ratio machine is employed for driving the two VRC evaporators in series. In both cases discussed herein, the same model gas turbine is employed. However, many gas turbine/compressor combinations may be employed.

In addition, best results in economy and performance are realized when the combinations of this invention are arranged and operated in accordance with the disclosures made herein.

Referring to the drawings which were briefly described above; specifically FIG. I which is a flow sheet of a preferred embodiment of our invention depicting an evaporative salt plant for the production of substantially pure salt, having a purity of at least 99.9974% NaCl purity.

The following description of FIG. I first describes the routing of streams containing salt (brine streams), then describes routing of steam condensate streams, and finally the routing of steam streams, which supply all of the energy for the process.

In FIG. I, the brine production facility (1) includes a solution mining brine installation for producing treated and polished brine having less than 10 ppm calcium, magnesium, and strontium ions and less than 500 ppm sulfate ion, and saturated in salt. This brine (2) is transported by pipeline to the salt plant site, arriving there at about 75 degrees F., where it is fed to a brine cooled condenser (3) (BCC), a shell and tube heat exchanger, for an initial stage of preheating effected by condensing the hot overhead vapors (4), which are at about 213 degrees F. after desuperheating. These vapors (4) are discharging from the purge evaporator (5), which is operated at about atmospheric pressure and about 228 degrees F. The elevated temperature is the result of boiling point elevation due to the concentration of salt in the boiling solution. The sources of brine feed and energy for the purge evaporator (5) are described later.

A portion of the brine (6) exiting the brine cooled condenser (BCC) (3), at about 140 degrees F., is diverted to the purge evaporator (5) elutriating leg via line (7). Another portion is diverted to the vapor recompressor (VRC) evaporator (12) elutriating leg via line (8). The balance (9) and majority (about 75%) of the brine is fed to the brine preheater (BP) (10), a plate and frame heat exchanger, for final preheating to the operating temperature (about 259 degrees F.) of the VRC evaporator (12). Line (11) transfers preheated brine into the VRC evaporator (12). Final preheating is effected by transfer of heat from hot condensate exiting the VRC evaporator (12) circulating heater (CH1).

As one follows the brine and salt streams through the system from this point: 1 Evaporated salt is removed as slurry (13) from the VRC evaporator (12) through its elutriating leg in which it is washed and cooled to about 150 degrees F. by brine (8) entering the bottom of the leg.

2 Impurities dissolved in VRC evaporator contents are controlled by purging brine liquor (14) at about 259 degrees F. from the VRC evaporator (12) to the purge evaporator (5) where additional evaporation will be effected as discussed later.

3 Feed liquor (14) and elutriating brine (7) make up the feeds to the purge evaporator (5). Salt slurry (15) produced in that evaporator (5) is washed and cooled to about 150 degrees F. by brine (7) entering the bottom of the purge evaporator elutriating leg. This slurry stream (15) and salt slurry stream (13) are both sent to the salt processing facility (17) where the slurries are centrifuged and prepared for shipment.

4 Impurities dissolved in the contents of the purge evaporator (5) are controlled by purging brine liquor (16), at about 228 degrees F., which is sent to a disposal well facility (18), which includes a dilution station, air cooler, tank, pumps and a disposal well. Sulfate ion content of the liquor (16) is controlled to produce the high purity salt by varing the purge rate.

Now we will refer to the condensate streams which originate at the brine cooled condenser (19), at both the purge and VRC evaporator circulting heaters (CH1 and CH2) (20 and 21), from the heat recovery steam generator (27) (HRSG), and from the vapor wash tank (not shown). The vapor wash tank is used to wash VRC evaporator overhead steam (25) of entrainment prior to introduction into the vapor compressor (26) suction nozzle. These streams, (19, 20 and 21), with the exception of vapor wash tank condensate, are collected in a condensate storage tank (23) and returned to the brine production facility (1) in pipeline (24). There it is used with makeup water to solution mine the salt deposit. Before it is routed to the condensate storage tank (23), stream (21) passes through the brine preheater (10) where its' sensible heat is released to the feed brine stream (9) prior to transferring it via line (22) to the condensate storage. In this configuration, recovery of sensible heat from this large condensate stream (21) is economically feasible. Such recovery of sensible heat from streams (19) and (20) is possible but not economical in this particular arrangement of the process. However, streams (19) and (20) are employable for heating buildings, shops, warehouses, etc. to avoid loss of this low grade energy.

Vapor wash tank (VWT) condensate, which is a minor salt carrier, is utilized to dilute (desaturate) stream (16), which is the purge from the purge evaporator, thereby avoiding salt precipitation and plugging of cooler heat exchange surfaces.

An internal loop exists within the condensate system in which condensate from storage (23) is fed via line (28) to supply feed water to the HRSG (27) and desuperheating condensate to each evaporator overhead stream, and also to the VRC compressor discharge (26) via line (29). Desuperheating avoids poor heat transfer efficiency in the large circulting heaters (CH1 and CH2) and brine cooled condenser (3) and cools the suction stream of the VRC compressor (26) to maximize compressor efficiency.

To provide for desuperheating steam vapor, line (29) branches in at least four locations, including the vapor recompressor discharge (30), vapor wash tank (not shown), VRC evaporator (12) overhead vapor to the purge evaporator circulating heater (31), and purge evaporator (5) overhead vapors (4) to the brine cooled condenser (3). Other uses (not shown) for the condensate include line washing for deposit removal and demister washing.

The only source of energy input for this process is fuel burned in a combustion gas turbine (37) which supplies energy to the process by two means. The first is combustion gas turbine (CGT) (37) shaft mechanical energy which drives the vapor recompressor (26). This compressor draws steam from the VRC evaporator (12) at about 10 psig and increase its pressure to about 30 psig which allows economical heating of the evaporator circulating heater (CH1). The second means is recovery of gas turbine (37) exhaust gas energy (34) by producing 600 psig, 820 degree F. steam (32) with a (HRGS) (27). This recovered energy is employed to drive a back pressure (topping) steam turbine generator (35) for supplying electrical power used in the plant. Exhaust steam (33) from the steam turbine (35) is combined with VRC discharge vapors in line (30), desuperheated, and fed via line (36) to the VRC evaporator (12) circulating heater (CH1) where it is condensed.

The above paragraph describes the essence of energy transfer to the process VRC evaporator (12). Steam generated in the HRSG (27) and vaporized desuperheating condensate fed via line (36) to the VRC evaporator (12) circulating heater (CH1) creates an excess of vapors (31) overhead from the evaporator, because the VRC compressor (26) can only pass a fixed amount of steam, which amounts to about 90% of vapor boilup in the VRC evaporator (12) for the described case.

The excess vapors (31) are desuperheated and routed to the purge evaporator (5) circulating heater (CH2) to supply boilup energy for that unit. In turn, overhead vapors (4) from the purge evaporator (5) are desuperheated and routed to the brine cooled condenser (3) and used for preheating feed brine.

The following description of FIG. II describes the gas turbine two stage vapor recomperssion evaporation unit. It employs the same approach used in describing FIG. I. All numbers in FIG. I are duplicated where applicable in FIG. II, and new numbering of FIG. II is used for added or modified components starting with numeral (50). Significant differences in identically numbered components in FIG. II exist and are as follows:

1. The VRC compressor (26) is a two stage machine in FIG. II and a single stage machine in FIG. I.

2. The first VRC evaporator (VRC1) (12) operates at 30 psig and 293 degrees F. in FIG. II and at 10 psig and 258 degrees F. in FIG. I. There is only one VRC evaporator (12) in FIG. I.

3. In FIG. II, the overhead vapors (31) from the initial VRC evaporator (12) are desuperheated and routed to the circulating heater (CH2) of the second, lower pressure, VRC evaporator (VRC2) (55). The evaporator operates at 10 psig and 258 degrees F., which conditions are substantially the same as those in the VRC evaporator (12) in FIG. I.

4. Stream (25), the VRC compressor suction in FIG. II, originates at the 10 psig second VRC evaporator (55) rather than at the VRC evaporator (12) of FIG. I.

5. Stream (29), the desuperheating condensate supply lines, has two additional process connections in FIG. II. One desuperheats steam (31) exiting from the first stage of the two stage vapor compressor. The second desuperheats the second VRC evaporator (VRC2) overhead stream (50).

Newly numbered components in FIG. II (other than (50) and (55) mentioned earlier), are now described:

a. Stream (54) supplies elutriating brine to the second VRC evaporator (55) and stream (52) transports salt slurry from the second VRC evaporator to the salt recovery and processing step (17) in similar manner to that employed for the VRC evaporator (12) in FIG. I.

b. Stream (50) transports excess steam from the second VRC evaporator (55) to the purge evaporator (5) circulation heater (CH3). This excess steam (50) is that generated from the second VRC evaporator (55) which exceeds the suction capacity of the two stage compressor (26). For the case depicted, stream (50) is about 60,500 PPH (pounds per hour) of 10 psig saturated steam after desuperheating.

c. Stream (51) transports purge brine liquor from the second VRC evaporator (55) to control brine liquor impurity concentration in VRC evaporator (55) and to supply feed brine to the purge evaporator (5).

d Stream (53), condensate exiting the second VRC evaporator (55) circulating heater (CH2) is combined with stream (21) and routed to the brine preheater (10) for heating the feed brine (9). In the two stage case, feed brine is preheated to approximately 10 degrees F. below operating temperature in the first VRC evaporator (12) or 283 degrees F.

Typical operating conditions for producing about 2500 TPD (tons per day) of high purity chemical grade salt (99.99% NaCl) by the preferred embodiment of this invention, shown in FIG. I, are given in Table I. The typical operating conditions for producing about 3000 TPD of similar high quality chemical grade salt by another preferred embodiment of this invention, shown in FIG. II, are given in Table II.

TABLE I

| NOS. IN FIG. I & II | DESCRIPTION | POUNDS PER HOUR FLOW | TEMP DEGREE F. | PRESSURE PSIG |
|---|---|---|---|---|
| 2 | Brine to Brine Cooled Condenser (BCC) | 800,000 | 75 | |
| 4 | Hot Overhead Vapors From Purge Evaporator to Brine Cooled Condenser | 56,000+ Desuperheating Condensate | 213 | 0–1 |
| 7, 8 | Elutriating Brine | 216,000 | 140 | |
| 9 | Brine Inlet Brine Preheater (BP) | 584,000 | 140 | |
| 11 | Brine Exit BP | 584,000 | 258 | |
| 14 | Purge Brine Feed Liquor to Purge Evaporator | 105,000 | 258 | |
| 16 | Purge Brine Liquor to Disposal Well Facility | 15,000 | 228 | |
| 17 | Salt Produced in Salt Recovery & Processing (99.9974% NaCl) | 209,250 (Dry Basis) | | |
| 19 | Condensate Exit Brine Cooled Condenser | 56,000+ Desuperheating Condensate | Greater Than 140 | |
| 20 | Condensate From Purge Evaporator CH2 | 46,000 Desuperheating Condensate | 238 | |
| 21 | Condensate From VRC Evaporator CH1 | 555,000 | 274 | |
| 24 | Condensate Return to Brine Production Facility | 556,000 | 180 (approx) | |
| 25 | VRC Evaporator Overhead Steam to Vapor Compressor | 500,000 | 239 | 10 |
| 31 | Excess VRC Evaporator Vapor to Purge Evaporator Circulating Heater (CH2) | 46,000+ Desuperheating Condensate | 239 | 10 |
| 32 | High Pressure Steam | 35,000 | 820 | 600 |
| 33 | Exhaust Steam From Turbine | 35,000 | 275+ | 30 |
| 35 | Steam Turbine Generator - 1.7 MW | | | |
| 36 | Desuperheated Steam to VRC Evaporator CH1 | 555,000 | 275 | 30 |
| | Natural Gas to Combustion Gas Turbine (CGT) | 112.28 MM Btu/hr. @ 80° F. Ambient | 80 | 600 |

TABLE II

| NOS. IN FIG. I & II | DESCRIPTION | POUNDS PER HOUR FLOW | TEMP DEGREE F. | PRESSURE PSIG |
|---|---|---|---|---|
| 2 | Brine to Brine Cooled Condenser (BCC) | 960,000 | 75 | |
| 4 | Hot Overhead Vapors From Purge Evaporator to Brine Cooled Condenser | 70,000 | 213 | 0–1 |
| 7, 8, 54 | Elutriating Brine | 260,000 | 140 | |
| 9 | Brine Inlet Brine Preheater (BP) | 700,000 | 140 | |
| 11 | Brine Exit BP | 700,000 | 283 | |
| 16 | Purge Brine Liquor to Disposal Well Facility | 18,000 | 228 | |

TABLE II-continued

| NOS. IN FIG. I & II | DESCRIPTION | POUNDS PER HOUR FLOW | TEMP DEGREE F. | PRESSURE PSIG |
|---|---|---|---|---|
| 17 | Salt Produced in Salt Recovery & Processing (99.9974% NaCl) | 250,000 (Dry Basis) | | |
| 19 | Condensate Exit Brine Cooled Condenser | 70,000 | Greater Than 140 | |
| 20 | Condensate From Purge Evaporator (CH3) | 60,500 | 238 | |
| 21, 53 | Condensate From VRC Evaporator Heaters | 619,000 | 293 | |
| 24 | Condensate Return to Brine Production Facility | 680,000 | 180 (approx) | |
| 25 | VRC Evaporator Overhead Steam to Vapor Compressor | 251,100 | 239 | 10 |
| 31 | First VRC Evaporator Vapor to Second VRC Evaporator Circulating Heater (CH2) | 307,000 | 275 | 30 |
| 32 | High Pressure Steam | 35,000 | 820 | 600 |
| 33 | Exhaust Steam From Turbine | 35,000 | 309+ | 62 |
| 35 | Steam Turbine Generator - 1.6 MW | | | |
| 36 | Desuperheated Steam to First VRC Evaporator Heater (CH1) | 312,000 | 309 | 62 |
| 50 | Second VRC Evaporator Excess Steam to CH3 | 60,500 | 239 | 10 |
| 51 | Purge Brine Feed Liquor to Purge Evaporator | 105,000 | 258 | |
| | Natural Gas to Combustion Gas Turbine (CGT) | 112.28 MM Btu/hr. @ 80° F. Ambient | 80 | 600 |

From the data in Table I it can be deduced that the energy efficiency of the entire plant is 536 Btu per pound of NaCl (99.9974% NaCl) produced in the single stage mode depicted in FIG. I and Table I. From the equivalent data in Table II, it is also apparent that the energy consumption per pound of NaCl (99.9974% NaCl) produced is 449 Btu per pound, because more salt, i.e. 250,000 pounds per hour, is produced in the two stage mode depicted in FIG. II and Table II, than the 209,250 pounds per hour produced by the single stage plant depicted in FIG. I and Table I, employing the same amount of energy input.

This compares to the Montedison plant referred to above whose energy efficiency is approximately 900 Btu per pound of salt produced, which salt is of lower purity (99.94% NaCl) than that produced by either the single stage or two stage modes of this invention. Thus, the single stage plant of FIG. I provides a 40% reduction in energy per ton of salt produced and the two stage plant of FIG. II provides a 50% reduction in energy per ton of salt produced.

Furthermore, from Tables I and II, it can be seen that the return condensate to the brine production facility is a majority of the solution mining water requirement for producing the feed brine, namely 83% of the water required is recycled condensate.

Also, from Tables I and II, it can be seen that the steam turbine generator is utilized to generate 1.7 and 1.6 MW of power, respectively, this being approximately that amount required to drive all electricity driven machinery in the evaporative salt plant, with minimal power excess for resale.

Still further, from Tables I and II, it can be seen that natural gas is the preferred fuel for the process to minimize the environmental impact of the HRSG stack gasses.

Although we have described our invention which employs a gas turbine for the production of evaporative high purity salt, we contemplate employing the plant design concept disclosed herein in other evaporative product plants. For example, in the evaporation of the cell liquor produced by electrolysis of NaCl brine for the manufacture of caustic soda and chlorine. In such application, the topping steam turbine energy could drive the chlorine and/or refrigeration compressor(s).

In order that our invention may be more readily understood we have described it in the foregoing description and drawings with respect to the preferred embodiment employing solution mined brine, which is substantially saturated with sodium chloride. It should be noted that lower concentrations of sodium chloride brine may be employed. When using lower concentrations of sodium chloride brine, the process would not be as economical as compared to employing concentrations of sodium chloride nearer saturation, because these lower concentrations require more evaporation of substantial amounts of water.

Furthermore, the process and apparatus of this invention are readily adapted to employing naturally occurring brines, such as see water, or, chemically produced brines resulting from neutralization reactions in the manufacture of chemicals, for example as in the manufacture of chloroprene, among other chemical manufactures, which produce by product brines. In such cases the brine usually contains a sodium chloride concentration of well below saturation.

Still further, the process and apparatus of this invention are readily adapted to be used in the conversion of existing multiple effect evaporation salt plants, electrically driven vapor recompression plants or combinations thereof, by employing the key components of this invention as disclosed.

It is to be understood that various modifications within the spirit and scope of our invention are possible, some of which have been referred to above, and although we have given detailed descriptions of preferred embodiments of our invention, by illustrating them with specific examples, we do not intend to be limited thereto, except as defined by the following claims.

We claim:

1. A method for producing high purity salt of at least about 99.99% NaCl content from brine in an evaporative salt plant installation which comprises:
    employing the shaft energy produced by a combustion gas turbine to drive a vapor recompressor while employing the gas turbine exhaust gases in a heat recovery steam generator to produce high pressure steam,
    employing this high pressure steam to drive a topping steam turbine which produces the electrical energy requirements of the evaporative salt plant installation,
    combining the discharging vapors from the topping steam turbine with the discharge vapors from the vapor recompressor,
    employing the combined vapors to heat the brine in the circulating heater of at least one vapor recompression evaporator, said vapor recompression evaporator being supplied with preheated brine to produce a salt slurry, separating the solid salt from the mother liquor, and purging a minor portion of the mother liquor which is supplied to a purge evaporator where it is evaporated to produce a second salt slurry, recycling the major portion of the mother liquor to said vapor recompression evaporator and supplying the gaseous overhead vapors to the vapor recompressor, and
    condensing the vapors produced by the purge evaporator in a brine cooled condenser where the input brine is used as the coolant, preheated and then supplied to the vapor recompression evaporator.

2. The method in accordance with claim 1 wherein the brine employed in the evaporative salt plant installation is chemically produced brine.

3. The method in accordance with claim 1 wherein the brine employed in the evaporative salt plant installation is solution mined brine.

4. The method in accordance with claim 3 wherein a single vapor recompression evaporator is used.

5. The method in accordance with claim 4 wherein the purge evaporator is operated at substantially atmospheric pressure.

6. The method in accordance with claim 4 wherein the brine exiting the brine cooled condenser is further preheated to the operating temperature of the vapor recompression evaporator.

7. The method in accordance with claim 4 wherein a portion of the steam from the vapor recompression evaporator is fed to the steam chest of the purge evaporator, said portion being approximately equal to the steam supplied by the topping steam turbine, thereby increasing both the capacity to produce salt and the energy efficiency of the plant installation.

8. The method in accordance with claim 4 wherein the impurities in the brine input are concentrated in the contents of the purge evaporator and are removed from the system by returning said impurities to the earth in a disposal well facility.

9. The method in accordance with claim 3 wherein two vapor recompression evaporators are employed in series, the preheated brine being supplied to the first vapor recompression evaporator, partially evaporated, and then supplied to the second vapor recompression evaporator where it is further evaporated, supplying a portion of the mother liquor from the second vapor recompression evaporator to the purge evaporator, compressing the vapors from the second vapor recompression evaporator, adding to the compressed vapors steam from the topping steam turbine, supplying the combined stream to the circulating heater in the first vapor recompression evaporator, the vapors from the first vapor recompression evaporator being supplied to the circulating heater of the second vapor recompression evaporator.

10. The method in accordance with claim 9 wherein the purge evaporator is operated at substantially atmospheric pressure.

11. The method in accordance with claim 9 wherein the brine exiting the brine cooled condenser is further preheated to the operating temperature of the vapor recompression evaporator.

12. The method in accordance with claim 9 wherein a portion of the steam from the second vapor recompression evaporator is fed to the steam chest of the purge evaporator, said portion being approximately equal to the stream supplied by the topping steam turbine, thereby increasing both the capacity to produce salt and the energy efficiency of the plant installation.

13. The method in accordance with claim 9 wherein the impurities in the brine input are concentrated in the contents of the purge evaporator and are removed from the system by returning said impurities to the earth in a disposal well facility.

14. The method in accordance with claim 9 wherein a two stage vapor recompressor driven by said combustion gas turbine is employed.

15. The method in accordance with claim 3 wherein the water condensates recovered from the recompressor evaporator circulating heaters, the purge evaporator circulating heater and the brine cooled condenser are used in solution mining the salt.

16. The method in accordance with claim 3 wherein substantially all steam available at atmospheric pressure in the plant installation is condensed and employed in heat transfer operations so that nearly all waste heat produced in the plant contributes to the efficiency of operations and conservation of the ecosphere.

17. The method in accordance with claim 3 wherein substantially all condensates produced in the evaporative plant installation are recovered and used in the solution mining of the salt thereby conserving the amount of makeup water needed to mine the salt.

18. The method in accordance with claim 3 wherein the sole source of energy input to the evaporative salt plant installation is the fuel fed to the combustion gas turbine.

19. The method in accordance with claim 3 wherein a vapor recompressor driven by said combustion gas turbine is employed.

20. An evaporative salt plant installation for producing high purity salt of at least about 99.99% NaCl content comprised of:
a vapor recompression evaporator with a circulating heater:
a combustion gas turbine whose shaft energy drives a vapor recompressor in overhead vapor communication with said vapor recompression evaporator which in turn provides heat to said steam vapor recompression evaporator circulating heater which includes recovery of the gas turbine exhaust heat to generate steam which is used to drive a topping steam turbine whose shaft energy drives an electrical generator, which produces the electricity required to run the plant, and whose exhaust vapors are combined with the discharge vapors of the vapor recompressor, said topping steam turbine exhaust vapors being used to effect additional boiling, above that effected by the discharge vapors of the vapor recompressor, in the vapor recompressor evaporator circulating heater, to produce salt;
said vapor recompression evaporator being in overhead vapor connection with the circulating heater of a purge evaporator and in liquid connection with the body of the purge evaporator, which utilizes steam resulting from the additional boiling effected in the vapor recompression evaporator by exhaust heat recovery,to produce additional salt;
said purge evaporator being in overhead vapor connection with a brine cooled condenser, wherein the water vapor overheads from the purge evaporator are used in said brine cooled condenser to initially preheat the input brine before final preheating, utilizing sensible heat from circulating heater condensate, before introduction of the brine to the vapor recompression evaporator.

21. An evaporative salt plant installation in accordance with claim 20 wherein the water condensates produced by the the brine cooled condenser and evaporator circulating heaters are recovered and routed to a brine production facility which includes a solution mining installation and a brine treating and polishing facility for use in solution mining underground salt.

22. An evaporative salt plant installation in accordance with claim 20 combined with a brine production facility which employs condensate recovered from overhead streams and make up water to produce purified feed brine containing less than 5 ppm calcium, magnesium and strontium ions and less than 500 ppm sulfate ions.

23. An evaporative salt plant installation in accordance with claim 22 combined with a disposal well facility, which includes a dilution station, air cooler, tank, pump and disposal well, which allows for disposal of calcium, magnesium, strontium and sulfate ion impurities.

24. An evaporative salt plant installation in accordance with claim 20 wherein the shaft energy of the gas turbine drives a vapor recompressor.

25. An evaporative salt plant installation in accordance with claim 20 wherein the shaft energy of the gas turbine drives a multi stage vapor recompressor to compress the vapors from the lowest pressure vapor recompression evaporator of two or more vapor recompression evaporators arranged in series.

26. An evaporative salt plant installation in accordance with claim 20 combined with a brine production facility employing chemically produced by-product brine.

* * * * *